United States Patent
Baldaccini

(10) Patent No.: US 10,099,332 B2
(45) Date of Patent: Oct. 16, 2018

(54) ELECTROSPINDLE WITH A TOOL EXCHANGING DEVICE

(75) Inventor: Stefano Baldaccini, Casiano (CH)

(73) Assignee: MARIO BALDACCINI, MECCANICA DI PRECISIONE, Caslano (CH)

( * ) Notice: Subject to any disclaimer, the term of this patent is extended or adjusted under 35 U.S.C. 154(b) by 980 days.

(21) Appl. No.: 14/127,084

(22) PCT Filed: Jun. 15, 2012

(86) PCT No.: PCT/IB2012/001162
§ 371 (c)(1),
(2), (4) Date: Feb. 6, 2014

(87) PCT Pub. No.: WO2012/172415
PCT Pub. Date: Dec. 20, 2012

(65) Prior Publication Data
US 2014/0148320 A1     May 29, 2014

(30) Foreign Application Priority Data
Jun. 17, 2011 (CH) .................... 1027/11

(51) Int. Cl.
*B23Q 3/157* (2006.01)
*B23Q 5/04* (2006.01)
(Continued)

(52) U.S. Cl.
CPC ..... *B23Q 3/15706* (2013.01); *B23Q 3/15534* (2016.11); *B23Q 3/15722* (2016.11);
(Continued)

(58) Field of Classification Search
CPC ......... Y10T 483/1752; Y10T 483/1755; Y10T 483/1757; Y10T 483/176; Y10T 483/179;
(Continued)

(56) References Cited

U.S. PATENT DOCUMENTS 3,473,419 A     10/1969  Ollearo
3,526,033 A  *  9/1970  Saunders .......... B23Q 3/15706
                                                483/54
(Continued)

FOREIGN PATENT DOCUMENTS

CH         502 866 A     2/1971
DE    19629991 A1  *  1/1998
(Continued)

OTHER PUBLICATIONS

Machine Translation of JP 2006-326768 A, which JP '768 was published Dec. 2006.*
(Continued)

*Primary Examiner* — Erica E Cadugan
(74) *Attorney, Agent, or Firm* — Young & Thompson

(57) ABSTRACT

An electrospindle device includes at least one electrospindle extending about a vertical axis, the electrospindle including a motor, a shaft that rotates for transmitting motion, and an engagement portion for a toolholder in which a tool rotatably actuated by the shaft is mounted, the tool being actuated directly by the shaft; at least one toolholder support element including at least two toolholders; and at least one device for rotating the at least one toolholder support element, wherein operation of the at least one device for rotating the at least one toolholder support element brings a selected one of said at least two toolholders into vertical alignment with the engagement portion and extending in the vertical axis.

17 Claims, 14 Drawing Sheets

(51) Int. Cl.
  *B23B 31/26*  (2006.01)
  *B23Q 3/155*  (2006.01)
  *B23Q 5/10*  (2006.01)
  *B23B 31/42*  (2006.01)

(52) U.S. Cl.
  CPC ............ *B23B 31/265* (2013.01); *B23B 31/42* (2013.01); *B23Q 5/10* (2013.01); *B23Q 2003/15527* (2016.11); *Y10T 409/309464* (2015.01); *Y10T 483/10* (2015.01); *Y10T 483/1795* (2015.01); *Y10T 483/1809* (2015.01)

(58) Field of Classification Search
  CPC ......... Y10T 483/1793; Y10T 483/1795; Y10T 483/1798; Y10T 483/1882; Y10T 409/309464; Y10S 483/90; B23Q 3/15534
  USPC ...... 483/39, 38, 41, 40, 900, 54, 55, 56, 57, 483/67; 409/233
  See application file for complete search history.

(56) References Cited

U.S. PATENT DOCUMENTS

| | | | | |
|---|---|---|---|---|
| 4,135,278 A | * | 1/1979 | Kitamura | B23B 39/205 29/26 A |
| 4,237,595 A | * | 12/1980 | Kitamura | B23B 31/265 29/26 A |
| 4,557,035 A | | 12/1985 | Ruetschle et al. | |
| 4,610,074 A | * | 9/1986 | Katsube | B23B 39/205 29/26 A |
| 5,782,586 A | * | 7/1998 | Geissler | B23B 31/261 408/56 |
| 5,782,593 A | * | 7/1998 | Klement | B23Q 5/048 409/231 |
| 6,036,415 A | * | 3/2000 | Sheehan | B23B 31/205 409/231 |
| 7,147,595 B1 | * | 12/2006 | Chen | B23C 1/06 29/33 P |
| 8,454,283 B2 | * | 6/2013 | Spath | B23Q 5/10 409/233 |
| 2002/0107122 A1 | * | 8/2002 | Hoppe | B23Q 3/1552 483/46 |
| 2005/0236169 A1 | * | 10/2005 | Xiao | B23B 31/261 173/213 |
| 2010/0032910 A1 | * | 2/2010 | Feldmeier | B23B 31/261 409/233 |

FOREIGN PATENT DOCUMENTS

| | | |
|---|---|---|
| GB | 2 024 055 A | 1/1980 |
| GB | 2 186 219 A | 8/1987 |
| JP | 2006-326768 A * | 12/2006 |

OTHER PUBLICATIONS

International Search Report, dated Sep. 19, 2012, from corresponding PCT application.

* cited by examiner

ELECTROSPINDLE WITH A TOOL EXCHANGING DEVICE

FIELD OF THE INVENTION

The present invention relates to the field of mechanical machining apparatuses and particularly of electrospindles.

Electrospindles are electromechanical components intended for drilling, milling, spot-facing, tapping, nicking, boring and grinding machining operations, and are commonly integrated in conventional machines, machining centers, milling machines, boring machines, grinding machines, lathes, transfer machines, etc.

PRIOR ART

In known machines, the tools are arranged in suitable toolholders positioned laterally of the electrospindle and suitable grippers provided for changing tools take the tool from the toolholder and engage it with the electrospindle based on the machining operation to be carried out.

The Applicant has observed that in known electrospindles the tool change in many cases still takes place manually, with big problems in terms of loss of time and manufacturing costs.

The Applicant has further observed that there are automatic devices for taking the tool from the toolholder and positioning the same in the electrospindle. However, such devices are very complicated and expensive and have not yet proven to be particularly effective and quick in the tool change process. Moreover, the current devices require particular fitting and adjustment operations for a correct positioning.

The Applicant has thus felt a need to provide an electrospindle device in which the change of a tool with another one can be carried out in a simple and quick way.

The Applicant has found that the abovementioned problems can be solved by providing a device in which the toolholders are integrated with and at least partially rotatable about the electrospindle.

SUMMARY OF THE INVENTION

In a first aspect thereof, the invention thus relates to an electrospindle device comprising:

at least one electrospindle extending about a vertical axis X-X';

said electrospindle comprising a motor, a rotating shaft for transmitting the motion, functionally associated with said motor, and an engagement portion for a toolholder in which a tool rotatably actuated by said shaft is mounted;

said tool being actuated directly by said shaft;

at least one toolholder support element comprising at least two toolholders;

each toolholder extending along a vertical axis;

characterized in that said toolholder support element is rotatably mounted so as to rotate for bringing each toolholder into alignment with the engagement portion; and in that the electrospindle device comprises at least one device for rotating the toolholder support element.

The present invention, in the aforementioned aspect, may have at least one of the preferred features hereinafter described.

Within the framework of the present invention by electrospindle it is meant a spindle provided with an internal motor adapted to make the spindle shaft to rotate.

Preferably, the electrospindle device comprises at least one translation unit for translating the toolholder support element between an operating position, in which at least a portion of the toolholder is engaged with said engagement portion, and a tool change position, in which the toolholder lies outside the engagement portion.

Advantageously, the toolholder support element comprises a plurality of fastening elements for fastening the toolholders to the toolholder support element and a plurality of locking devices of the toolholders.

Preferably, the fastening elements comprise support plates fastened by means of removable fastening means to the said toolholder support element; each support plate comprising a seat for a toolholder.

Conveniently, each locking element comprises at least one engagement element for engaging the toolholder, at least one elastic element for pushing the said engagement element into engagement with the said toolholder, at least one counteracting element for the said elastic element and a release device for releasing the engagement of the said engagement element with the said toolholder.

Advantageously, the release device for releasing the engagement of the engagement element with the toolholder comprises a shaped profile functionally associated with the engagement element adapted to be actuated by a counter-shaped profile of an actuating pin.

Preferably, the toolholder support element comprises a plurality of toolholders mounted along a circumference.

Advantageously, the translation unit comprises a pneumatic cylinder adapted to translate the toolholder support element along the axis X-X' of the electrospindle.

Advantageously, the toolholders are arranged along a circumference slanting relative to the axis X-X' of the electrospindle.

Preferably, the electrospindle device comprises a tight sealed casing at least partially comprising the electrospindle adapted to be coupled with the said toolholder support element.

According to another aspect, the present invention relates to a process for changing tools in an electrospindle device, comprising the steps of:

a) lifting the said toolholder support element so that the plate contacts the toolholder 3;

b) engaging the said engagement elements with the toolholder;

c) releasing the toolholder from the engagement portion of the electrospindle;

d) lowering the toolholder support element until the toolholder is extracted from the said engagement portion;

e) rotating the said toolholder support element for bringing the said engagement portion of the electrospindle into alignment with a second toolholder;

f) lifting the said toolholder support element until the said toolholder is at least partially inserted into the said engagement portion;

g) connecting the toolholder to the engagement portion;

h) disengaging the said engagement elements from the toolholder.

Advantageously, after said step h) a further lowering of the toolholder support element is carried out.

BRIEF DESCRIPTION OF THE DRAWINGS

Further features and advantages of the invention shall become more apparent from the detailed description of some preferred, although not exclusive, embodiments of an electrospindle device and of a process for changing a tool in the said electrospindle device according to the present invention.

Such description shall be presented hereinafter with reference to the accompanying drawings, provided only for indicating, and thus non-limiting, purposes, wherein.

DETAILED DESCRIPTION OF EMBODIMENTS OF THE INVENTION

Figure 1:
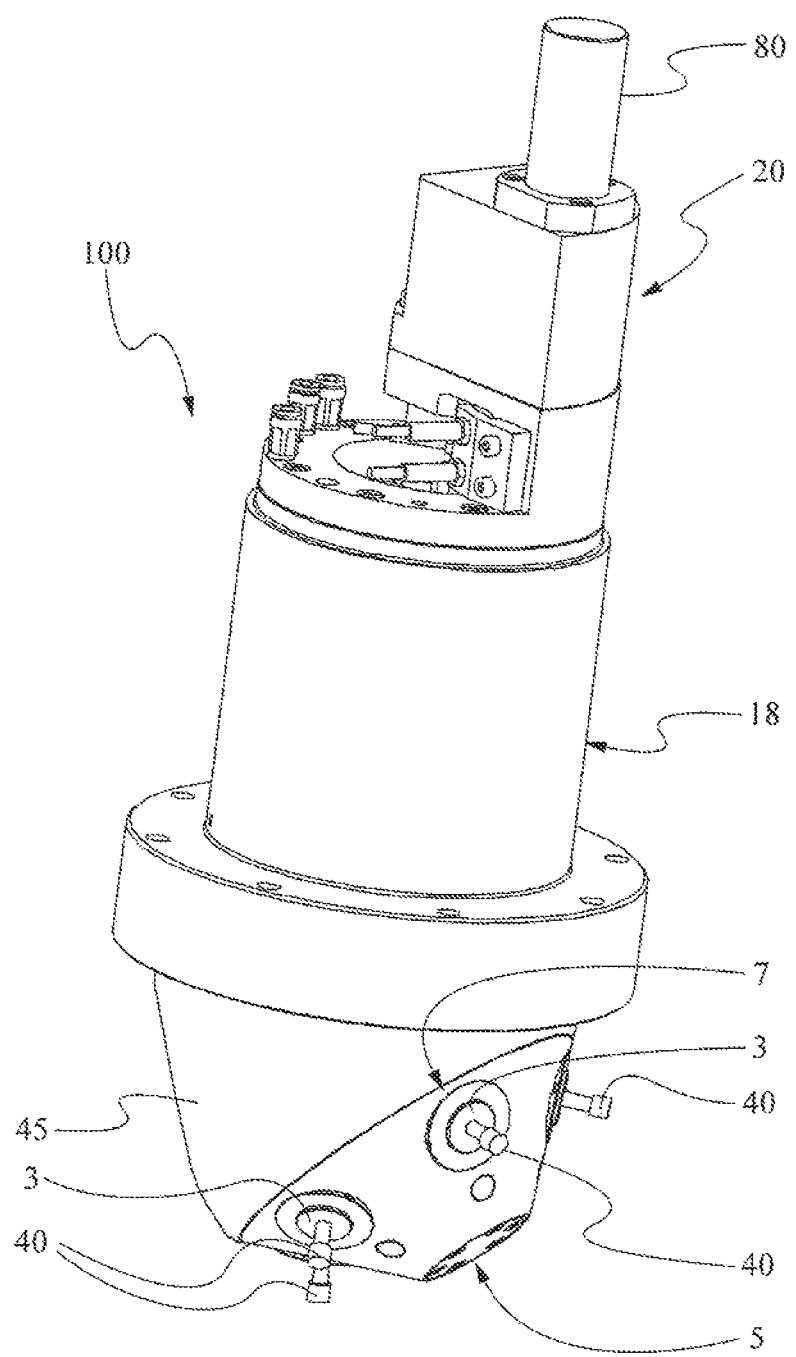
FIG. 1 is a schematic view of an electrospindle device according to the present invention with a casing portion removed from it.

Referring to FIGS. 1-14, an electrospindle device according to the present invention is identified by reference numeral 100.

Figure 2:
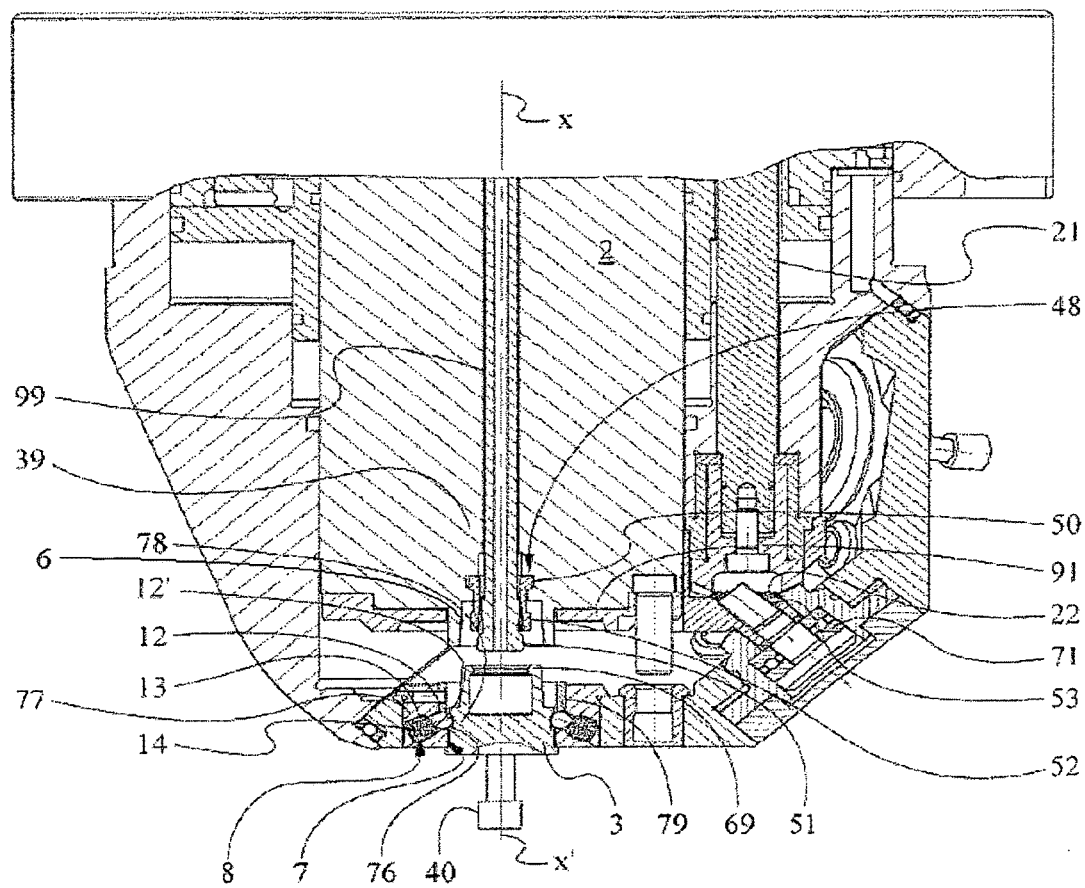
FIG. 2 is a schematic partially sectional view of the electrospindle device shown in FIG. 1.

As shown in FIGS. 1 and 2, the electrospindle device 100 comprises at least one electrospindle 2 extending about a vertical axis X-X'.

The electrospindle 2 has, at a head end thereof, an engagement portion 6 for a toolholder 3.

The engagement portion 6 is configured as a conical seat adapted to receive a corresponding conical portion of a toolholder 3.

Referring to the embodiment shown in FIGS. 1-7, the electrospindle device 100 further has a toolholder support element 5 provided with at least two toolholders 3, preferably with a plurality of toolholders 3, each holding a suitable machining tool 40.

The toolholder support element 5 is rotatably mounted about an axis so as to rotate for bringing a toolholder 3 and its tool 40 into alignment with the engagement portion 6 of the electrospindle 2 and allowing the same, based on the kind of machining operation to be carried out, to be connected with a tool locking device 48, the latter allowing the engagement between the rotating shaft 39 of the electrospindle 2 and the tool 40.

In the conical seat of the engagement portion 6 it is thus received the tool locking device 48 of a toolholder 3 for connecting and, thanks to the electrospindle 2, making the toolholder 3 to rotate together with the electrospindle 2.

For this purpose, the corresponding conical portion of the toolholder 3 has a section narrowing 69 and a cylindrical gripper 50, steadily associated with the head end of a tie rod 99 within the rotation shaft 39 of the electrospindle 2, is provided. The cylindrical gripper 50 is provided with a plurality of cuts circumferentially arranged and directed according to the axis X-X'. The head end of the tie rod 99 can slide along the axis X-X' of the said shaft 39 of the electrospindle 2 relative to the cylindrical gripper 50 so as to cause the outer diameter of the latter to be increased or reduced.

The head end of the tie rod 99 of the electrospindle 2 has a conical outer surface 51 and the cylindrical gripper 50 has a corresponding conical inner surface.

Figure 3:
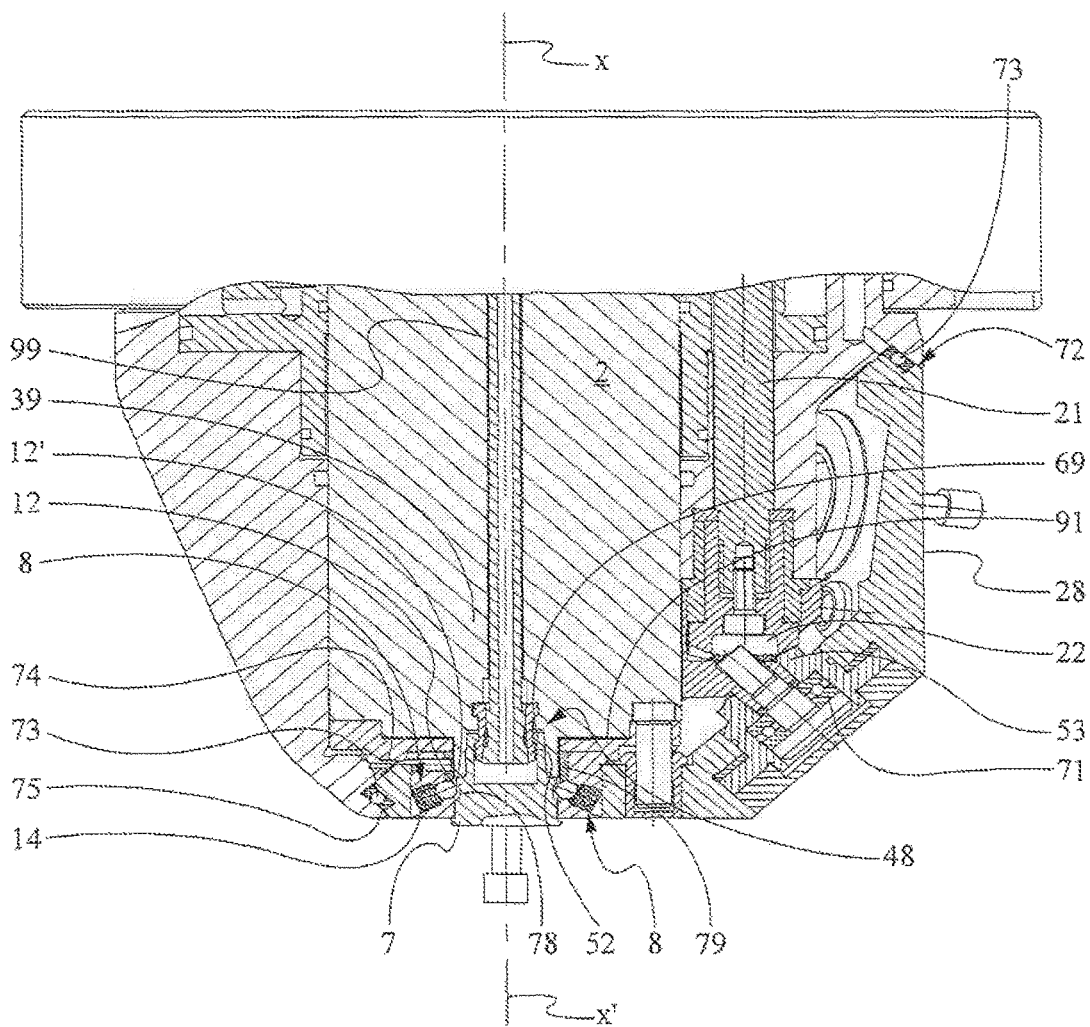
FIG. 3 is a schematic enlarged, partially sectional view of the lower end of the device shown in FIGS. 1 and 2 according to the present invention, with a toolholder engaged in the tool locking device.

When the head end of the tie rod 99 is in its upper position, shown in FIG. 3, the outer surface 52 of the cylindrical gripper 50 engages the section narrowing 69, thus locking the toolholder 3 relative to the shaft 39 of the electrospindle 2, and the latter can thus make the toolholder 3 and the tool 40 to rotate.

When instead the head end of the tie rod 99 is in its lower position, shown in FIG. 2, the outer surface 52 of the cylindrical gripper 50 does not engage the section narrowing 69.

In this condition, the position of the cylindrical gripper 50 relative to the shaft 39 of the electrospindle 2, particularly the position of its inner conical surface relative to the surface of the end of the tie rod 99, is such that the outer surface 52 of the of the cylindrical gripper 52 has a diameter which allows passing through the section narrowing 69.

In this way the shaft 39 of the electrospindle 2 can be disengaged from the toolholder 3.

In FIGS. 8-14 an alternative embodiment is shown, in which the engagement portion 6 is configured as a conical seat where a self-centering device 38 actuated by an internal piston cylinder 43 of the hydraulic or pneumatic type, only partially shown in the figures, is received in a known manner.

The self-centering device 38 arranged inside the electrospindle 2 is shaped so as to engage the shank 27 of a toolholder 3 for connecting the toolholder 1 and, thanks to the electrospindle 2, bringing the same into rotation together with the electrospindle 3.

In all of the embodiments shown in the figures, the toolholder support element 5 is rotatably mounted about an axis Z-Z' slanting relative to the axis X-X' of the electrospindle 2.

On the toolholder support element 5 there are a plurality of toolholders 3 arranged along a circumference slanting relative to the axis X-X' of the said electrospindle 2.

The slanting position of the toolholders 3 allows the tools which are not active to be moved away from the operating area.

The toolholder support element 5 has a substantially frustoconical shape and the toolholders are arranged on the lateral surface 28 of the frustum of cone.

In order to bring the toolholder support element 5, and thus the toolholders 3, into rotation, the electrospindle device 100 has a rotation device 20.

According to a first embodiment shown in FIGS. 1-3, the rotation device 20 has a motor 80 incorporating an encoder, which directly actuates an intermediate shaft 21 adapted to support a first toothed wheel 22 coupled with a second toothed wheel 53 supported by at least one bearing and steadily associated with the toolholder support element 5.

The rotation of the intermediate shaft 21 makes the first toothed wheel 22 to rotate. The latter transmits the rotation to the second toothed wheel 53 thus causing the rotation of the toolholder support element 5 about the Z-Z' axis.

Figure 4:
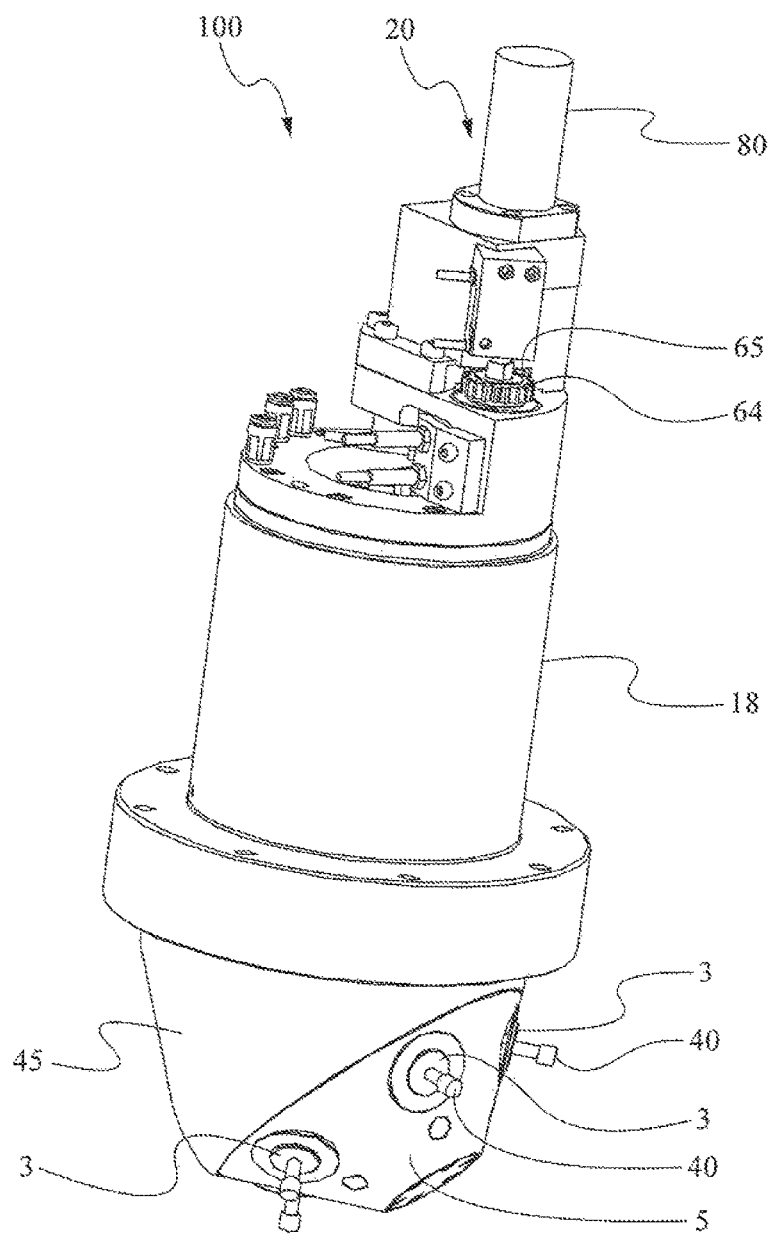
FIG. 4 is a schematic view of an another embodiment of the electrospindle device according to the present invention with a casing portion removed from it.

According to another embodiment, shown in FIG. 4, the rotation device 20 has a motor 80 incorporating an encoder and a pair of first gears 64, 65, of which a first one 65 mounted on the output shaft of the motor 80 and a second one 64 arranged at the upper end of the intermediate shaft 21.

Figure 5:
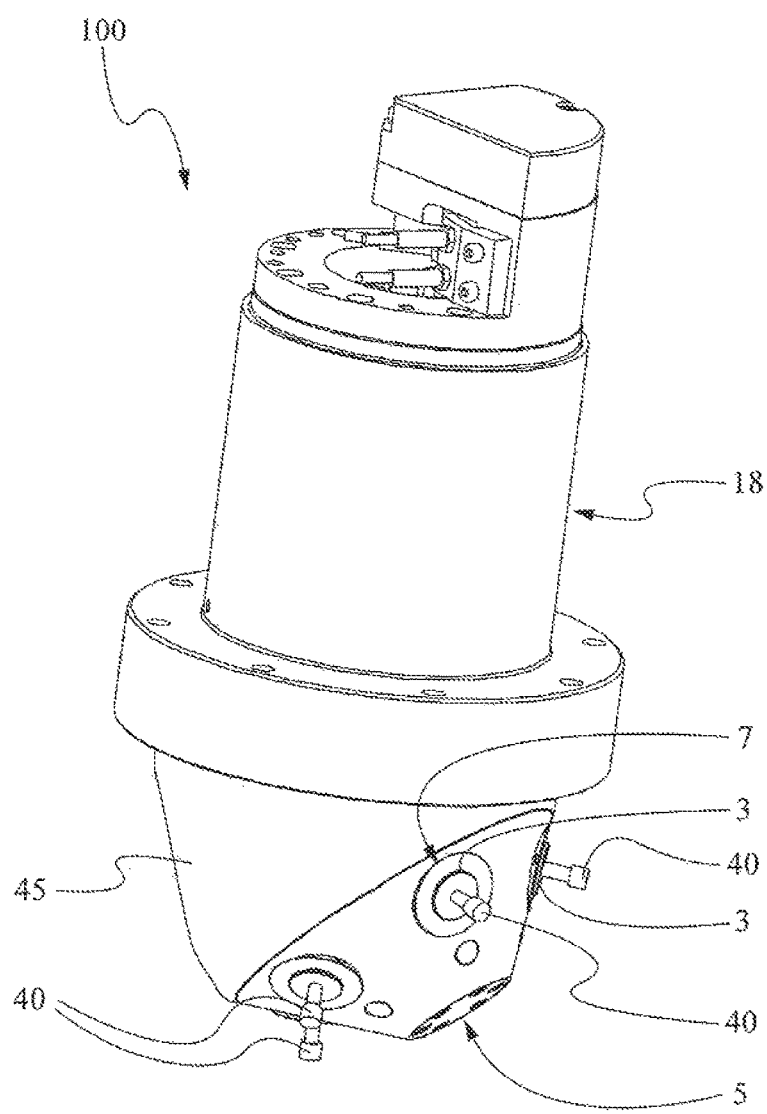
FIG. 5 is a schematic view of an another embodiment of the electrospindle device according to the present invention with a casing portion removed from it.
Figure 6:
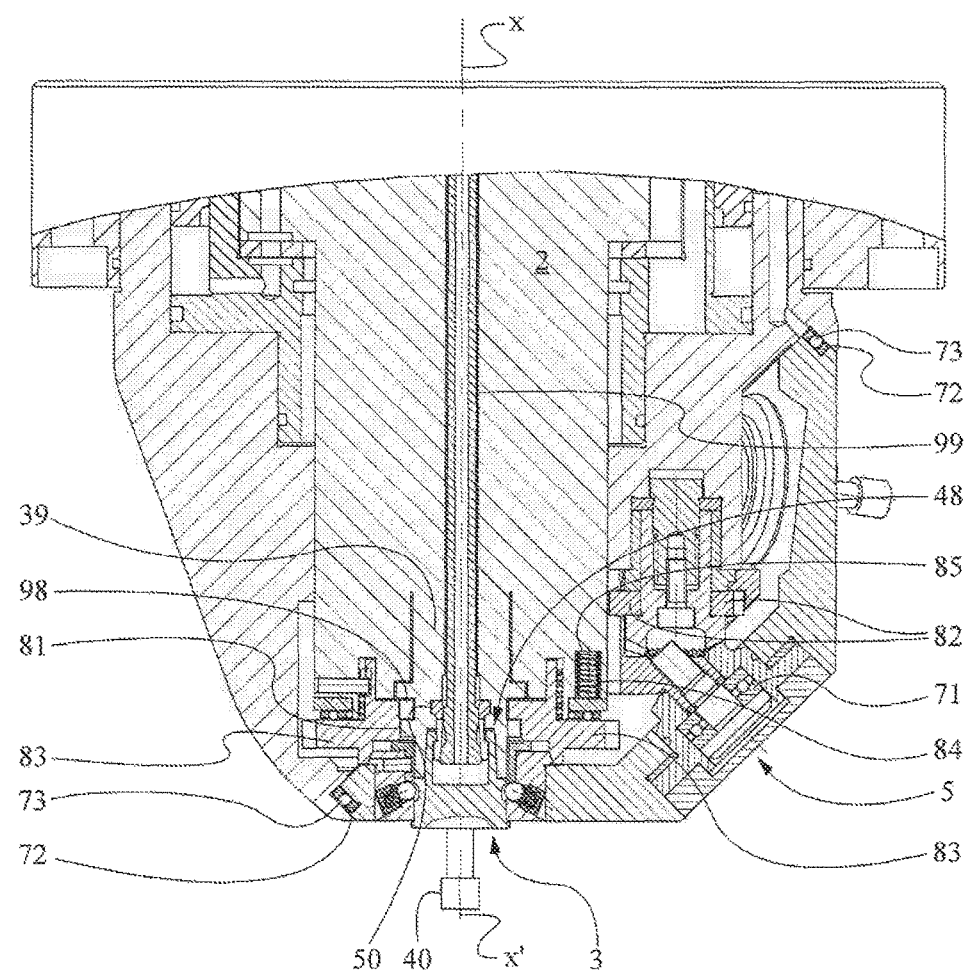
FIG. 6 is a schematic enlarged, partially sectional view of the lower end of the device shown in FIG. 5 according to the present invention, with a toolholder engaged in the tool locking device.
Figure 7:
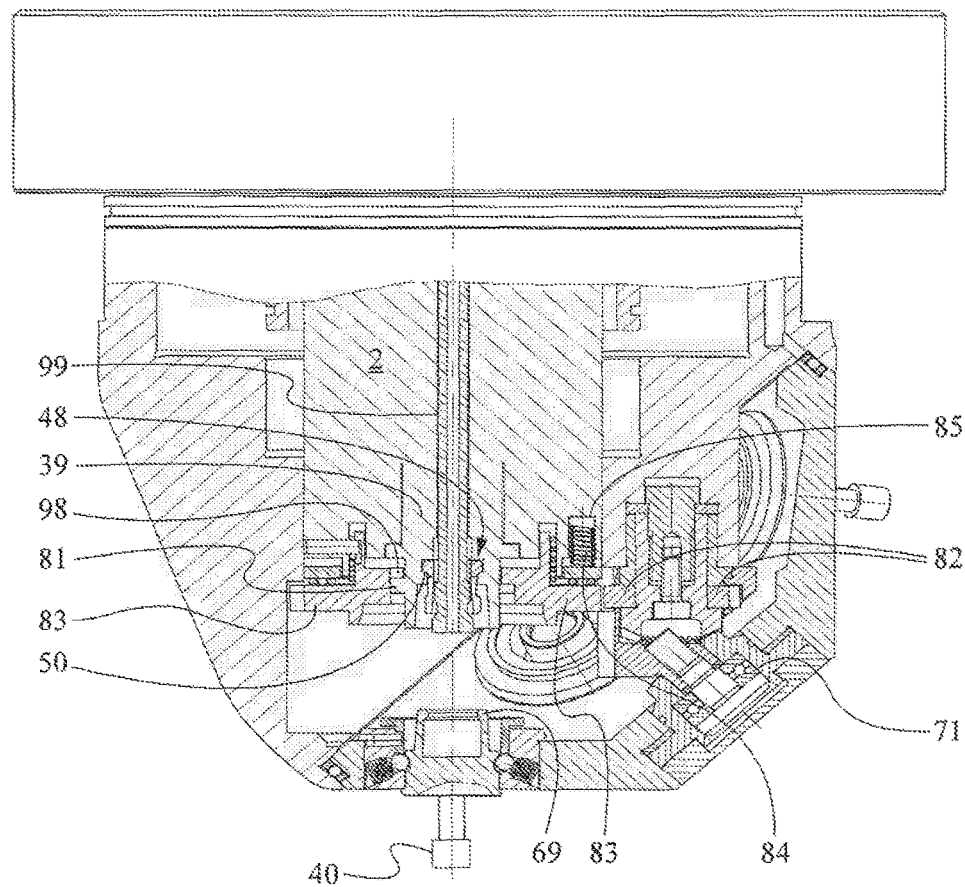
FIG. 7 is a schematic enlarged, partially sectional view of the lower end of the device shown in FIG. 5 according to the present invention.

According to another embodiment, shown in FIGS. 5-7, the rotation device 20 has motor incorporating an encoder (in this case, the motor is the motor which makes the electrospindle 2 to rotate), a first gear 81 integral with the rotating shaft 39 of the electrospindle 2, at least one second gear 82 steadily associated with the toolholder support element 5 and such that its rotation causes the rotation of the toolholder support element 5 and thus of the toolholders 3 carried by the latter, and at least one third gear 83 arranged between the electrospindle 2 and the toolholder support element 5.

The third gear 83 is coaxially mounted on the rotating shaft 39 of the electrospindle and can slide relative to the same between an operating position (shown in FIG. 7), in which it engages directly the second gear 82 and, by means of a further gear 98, the first gear 81, so that the rotation of the rotating shaft 39 of the electrospindle 2 causes a rotation of the toolholder support element 5, and a rest position (shown in FIG. 6), in which it is disengaged from the gear 98 and thus form the first gear 81 an the second gear 82.

In the rest position, FIG. 6, the rotating shaft 39 of the electrospindle 2 is engaged with a toolholder 3 and its rotation causes the rotation of the tool 40 held by the latter.

The transition from the operating position to the rest position is caused by the translation movement of the support element 5 relative to the electrospindle 2 and by an elastic element 84 arranged in a vertical seat 85 of the electrospindle 2 and adapted to push the third gear 83 so as to cause the disengagement from the gear 98 and from the third gear 83.

For improving the rotation between the toolholder support 5 and the electrospindle 2, in the embodiments shown in FIGS. 1-7 there are provided an axial bearing 71 and a cage 72 comprising a plurality of balls 73 interposed between said toolholder support element 5 and the electrospindle 2.

The cage 72 with the plurality of balls 73, arranged along a circumference, defines a ball bearing having substantially the larger diameter of the toolholder support 5.

By means of the abovementioned solution a better rotation and a greater angular positioning accuracy of the toolholder support 5 relative to the electrospindle 2 are obtained.

According to another embodiment shown in FIGS. 8-14, the rotation device 20 has a pneumatic cylinder, which thanks to a stepping system actuates an intermediate shaft 21 adapted to support a first toothed wheel 22 coupled with a second toothed wheel 53 supported on bearings and steadily associated with the toolholder support 5.

Also in this case, the rotation of the intermediate shaft causes the rotation of the first toothed wheel 22, which, by transmitting the rotation to the second toothed wheel 53, causes the rotation of the toolholder support 5 about the Z-Z' axis.

In all of the embodiments, the toolholder support element 5, beside being able to rotate about the Z-Z' axis, may translate in vertical direction relative to the electrospindle 2, i.e. along a vertical direction defined by the axis X-X' of the electrospindle 2.

In detail, the toolholder support element 5 may translate in vertical direction relative to the electrospindle 2 between an operating position, in which the tool 40 is active on the mechanical piece to be manufactured, and a tool change position, which allows the electrospindle 2 to change the toolholder 3 and thus the tool 40.

For this purpose, the electrospindle device 100 has a translation unit comprising a pneumatic cylinder 18 adapted to translate the toolholder support element 5 and the anchoring element 19 for the toolholder support element 5.

The pneumatic cylinder 18 an the anchoring element 19 for the toolholder support 5 are connected with each other by two stems 20 connected with the piston of the pneumatic cylinder 18, the anchoring element 19 is steadily associated with the toolholder support 5.

The actuation of the pneumatic cylinder 18 vertically translates along the axis X-X' the anchoring element 19 by means of the stems 20 and thus the toolholder support element 5 steadily associated therewith.

The vertical translation of the toolholder support 5 causes the vertical translation, substantially along the axis X-X', of the toolholders 3 and thus of the tools 40 engaged therein.

The toolholder support element 5 comprises a plurality of fastening elements 7 for fastening the toolholders 3 to the toolholder support element itself and a plurality of locking devices 8 of the toolholders 3.

In the embodiment shown in FIGS. 1-7 the fastening elements 7 comprise fastening seats 76 formed in the said toolholder support element 5, to adapted to receive at least a portion of a toolholder 3 and to keep the same locked in position by means of suitable locking elements 8.

As better shown in FIGS. 2 and 3, each locking element 8 is arranged in a blind seat 77, radially located relative to the fasting seat 76, of the toolholder support 5 and comprises at least one engagement element 12 for engaging the toolholder 3, at least one elastic element 13 for pushing the engagement element 12 into engagement with the toolholder 3 and at least one counteracting element 14 for the elastic element 13.

In the preferred embodiment shown in FIGS. 1-3, the elastic element 13 is represented by a helical spring which pushes the engagement element 12, represented by a ball 12', against a recess 78 formed in the outer surface of the toolholder 3.

The counteracting element 14 is represented by the bottom of a radial blind seat 77.

At least two locking elements 8 are provided for each toolholder 3.

When the ball 12' is engaged in the radial recess 78 the toolholder 3 is kept in a locked state and steadily associated with the toolholder support element 5. In order to release the toolholder 3, a release device for releasing the engagement element 12 from the said toolholder 3 is provided.

Advantageously, the release device comprises a cylindrical bush 79 mounted so as to slide on the said toolholder 3 along a direction parallel to the axis X-X' of the electrospindle 2 and a flanged portion 91 steadily associated with the electrospindle 2 and adapted to come into abutment against the bush so as to cause the translation thereof in a direction parallel to the axis X-X' of the electrospindle 2, further to the translation of the toolholder support element 5, relative to the electrospindle.

When the flanged portion 91 comes into abutment with the bush 79, it pushes the latter downwards along a direction parallel to the axis X-X', the bush 79 in turn comes into abutment against the balls 12' moving them away from the radial recess 78 and freeing the toolholder 3 from the toolholder support element 5.

According to the embodiment shown in FIGS. 8-14, the fastening elements 7 comprise support plates 9 fastened by means of removable fastening means 10 to the said toolholder support element 5.

In the embodiment shown in FIGS. 8-14, the removable fastening elements 10 are screws engaging threaded seats of the toolholder support element 5.

Each support plate 9 comprises a seat 11 for a toolholder 3.

Figure 13A:
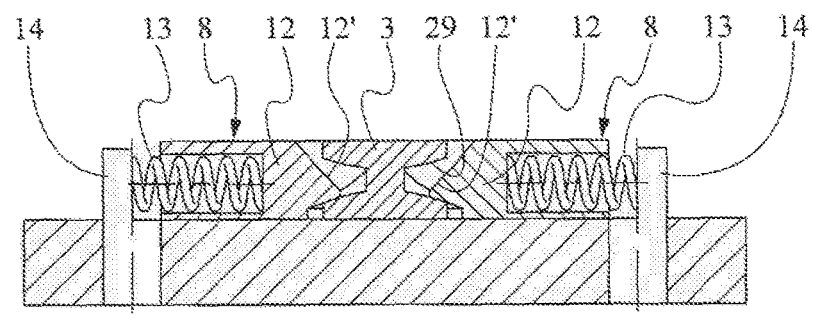
FIG. 13A is a sectional view of a fastening element for fastening the toolholder to the toolholder support element, taken along the line A-A of FIG. 12.
Figure 13B:
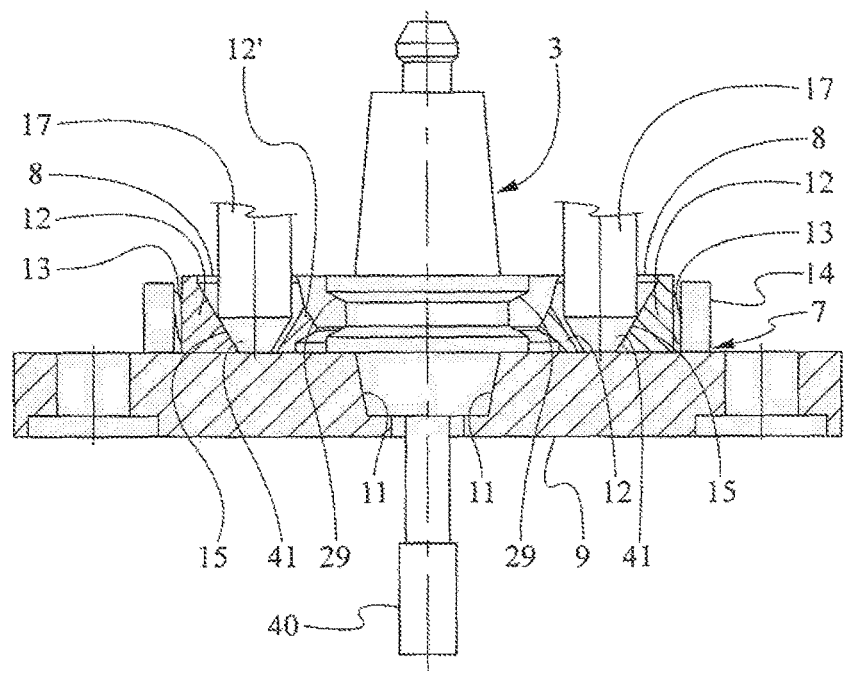
FIG. 13B is a sectional view of a fastening element for fastening the toolholder to the support element, taken along the line B-B of FIG. 12.
Figure 14:
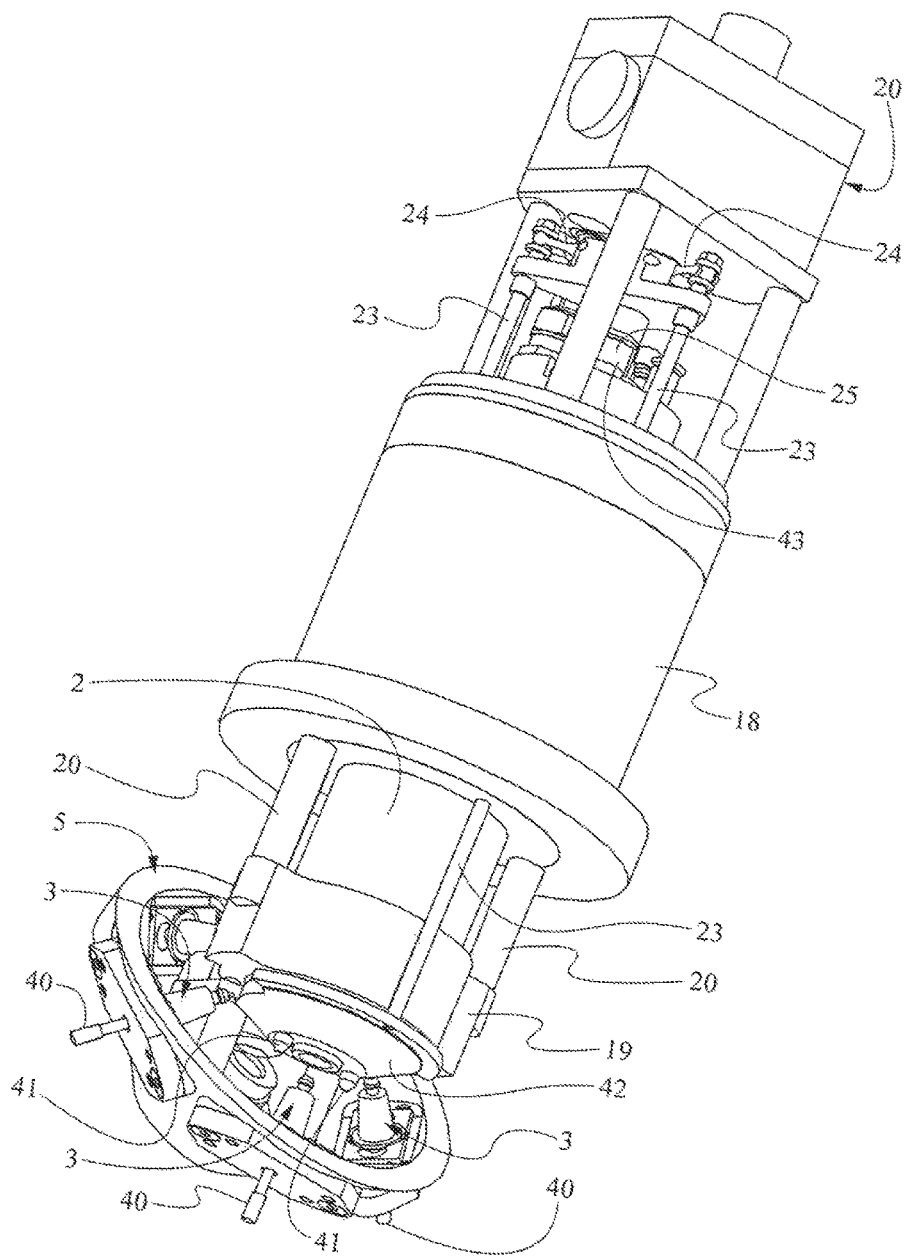
FIG. 14 is a schematic view of a portion of the device according to the present invention, in which the first, the second and the third casing have been removed.

As better shown in FIGS. 13A, 13B, each locking element 8 is fastened on the support plate 9 and comprises at least one engagement element 12 for engaging the toolholder 3, at least one elastic element 13 for pushing the engagement element 12 into engagement with the toolholder 3 and at least one counteracting element 14 for the elastic element 13.

In this embodiment the elastic element 13 is represented by a helical spring which abuts against the engagement element 12, represented by a gripper 12', and the counteracting element 14, represented by a jut projecting from the support plate 9.

As shown in FIGS. 13A, 13B, there are two helical springs which act so as to keep the gripper 12' engaged with the toolholder 3, particularly with a groove-like seat 29 formed on the outer surface of the same toolholder 3.

When the gripper 12' engages the groove-like seat 29 the toolholder 3 is kept locked and steadily associated with the toolholder support element 5. In order to release the toolholder 3, a release device for releasing the engagement element 12 from the said toolholder 3 is provided.

Advantageously, the release device comprises a shaped profile 15 functionally associated with the engagement element 12 adapted to be actuated by a corresponding counter-shaped profile of an actuating pin 17.

In the embodiment shown in FIG. 13B, the shaped profile 15 is defined by a conical seat formed in the engagement element 12 and the counter-shaped profile is defined by the conical end of a cam 41.

The cams 41 are supported by a cam holder disc 42 connected with three rods extending over the whole vertical extension of the electrospindle 2.

Each rod 23 is connected with a lever 24 and a central tie rod 25 extending vertically inside the electrospindle 2 and functionally connected with the internal piston 43 of the hydraulic or pneumatic type.

The internal piston 43 of the electrospindle together with the central tie rod 25 controls the release of the toolholder from the engagement portion 6 of the electrospindle and the movement of the cams 41 by means of the central tie rod 25, the levers 24 and the rods 23.

According to an advantageous aspect of the present invention, the device 100 has a first casing 45 tight sealed, at least partially comprising the electrospindle 2 and adapted to be coupled with the toolholder support element 5.

The device 100 further comprises a second casing 46, adapted to be coupled with the first casing 45, and a third casing 47.

The second and the third casing 46, 47 extend along the electrospindle 2, completely enclose the electrospindle and, together with the toolholder support 5 and the pneumatic cylinder 18, form a fully closed and integrated device 100, adapted to protect the electrospindle 2, the translation unit for translating the toolholder support element 5 and the device for rotating the toolholder support element 5.

The tight sealing of the internal components is ensured by a continuous injection of blown air inside the casings 45, 46, 47, by means of suitable blowing means, such as for example a compressor and an electrovalve.

In this way, the pressure generated inside by means of this air injection does not allow foreign bodies to penetrate inside.

In other words, the electrospindle 2, the translation unit for translating the toolholder support element 5 and the device for rotating the toolholder support element 5 are contained in an enclosure consisting of a first casing 45, a second casing 46, a third casing 47, the pneumatic cylinder 18 and the toolholder support element 5.

The electrospindle device 100 is adapted to carry out different machining operations by inserting in the tool locking device 48 or in the self-centering device 38 the toolholder 3 with the most suitable tool 40, the latter being selected from the toolholder support element 5, rotatably mounted relative to the electrospindle 2.

For changing tool between one machining operation and the subsequent one, the following steps are carried out.

The toolholder support element 5 is lowered so that the flanged portion 91 moves away from bush 79 and no longer abuts with it.

At this point, the engagement elements 12, represented by the balls 12', are brought into engagement with the toolholder 3, in particular the balls 12' are brought into engagement with the radial recess 78 of the toolholder 3 by means of the springs 13.

The toolholder 3 is released from the engagement portion 6 of the electrospindle 2, in particular from the tool locking device 48, thanks to a downward sliding of the head end of the tie rod 99.

The downward sliding causes the outer diameter of the cylindrical gripper 50 to be reduced so that its passage through the section narrowing 69 and therefore the disengagement of the toolholder 3 from the engagement portion 6 become possible.

The toolholder support element 5 is then lowered until the toolholder 3 is extracted from the said engagement portion 6.

At this point, the toolholder support element 5 is rotated for bringing the spindle engagement portion 6, and particularly the tool locking device 40, into alignment with a second toolholder 3, holding a second tool 40 to be used in the machining operation.

For connecting the second tool 40 the toolholder support element 5 is thus lifted again until the toolholder 3 is inserted in the engagement portion 6, so that the tool locking device 48 can lock the toolholder 3.

Alternatively, for changing tool, between one machining operation and the subsequent one, in the embodiment shown in FIGS. 8-14 the following steps are carried out.

The toolholder support element 5 is lifted so that the plate 9 contacts the toolholder 3, and particularly so that there is no clearance between the latter and the seat 11. At this point, the engagement elements 12, represented by the grippers 12', are brought into engagement with the groove-like seat 29 of the toolholder 3 by means of the spring 13.

The toolholder 3 is released from the engagement portion 6 of the electrospindle 2, particularly from the self-centering device 38 by actuating the internal piston cylinder 43.

Alternatively, first the toolholder 3 could be released from the engagement portion 6 of the electrospindle 2 and immediately afterwards the engagement elements 12, represented by the grippers 12', could be brought into engagement with the toolholder 3.

The toolholder support element 5 is then lowered until the toolholder 3 is extracted from the said engagement portion 6.

At this point, the toolholder support element 5 is rotated for bringing the electrospindle engagement portion 6, and particularly the self-centering device 38, into alignment with a second toolholder 3, holding a second tool 40 to be used in the machining operation.

For connecting the second tool 40 the toolholder support element 5 is then lifted again until the toolholder 3 is inserted into the engagement portion 6, so that the self-centering device 38 can lock the shank 27 of the toolholder 3.

The toolholder 3 is then connected with the engagement portion 6 and particularly with the self-centering device 38.

The engagement elements 12 are then disengaged from the toolholder 3, in particular the grippers 12' are brought away from the groove-like seat 29 of the toolholder 3.

Also in this case, alternatively, first the engagement elements 12 could be disengaged from the toolholder 3, and subsequently the toolholder 3 could be connected with the engagement portion 6 and particularly with the self-centering device 38.

For this purpose, the pins 17 are lowered so that the counter-shaped profile of the cam 41 by pushing against the shaped profile 15 of the engagement element 12 forces the latter to move backwards in the direction of the counteracting element 14 for releasing the toolholder 3.

A further lowering of the toolholder support element 5 is then carried out, thus increasing the clearance in axial direction between toolholder 3 and plate 9, so that during the machining operations the plate 9 and the toolholder 3 do not interfere with each other.

This lowering of the toolholder support element 5 can be obtained by means of the pins 17, which, when come down, first open the grippers 12 and then, lying against the plate 9, push the same downwards creating an axial clearance between the plate 9 and the toolholder 3.

According to an alternative embodiment, the aforementioned lowering could be caused by the motion of an additional cylinder incorporated into the cylinder 18.

Figure 8:
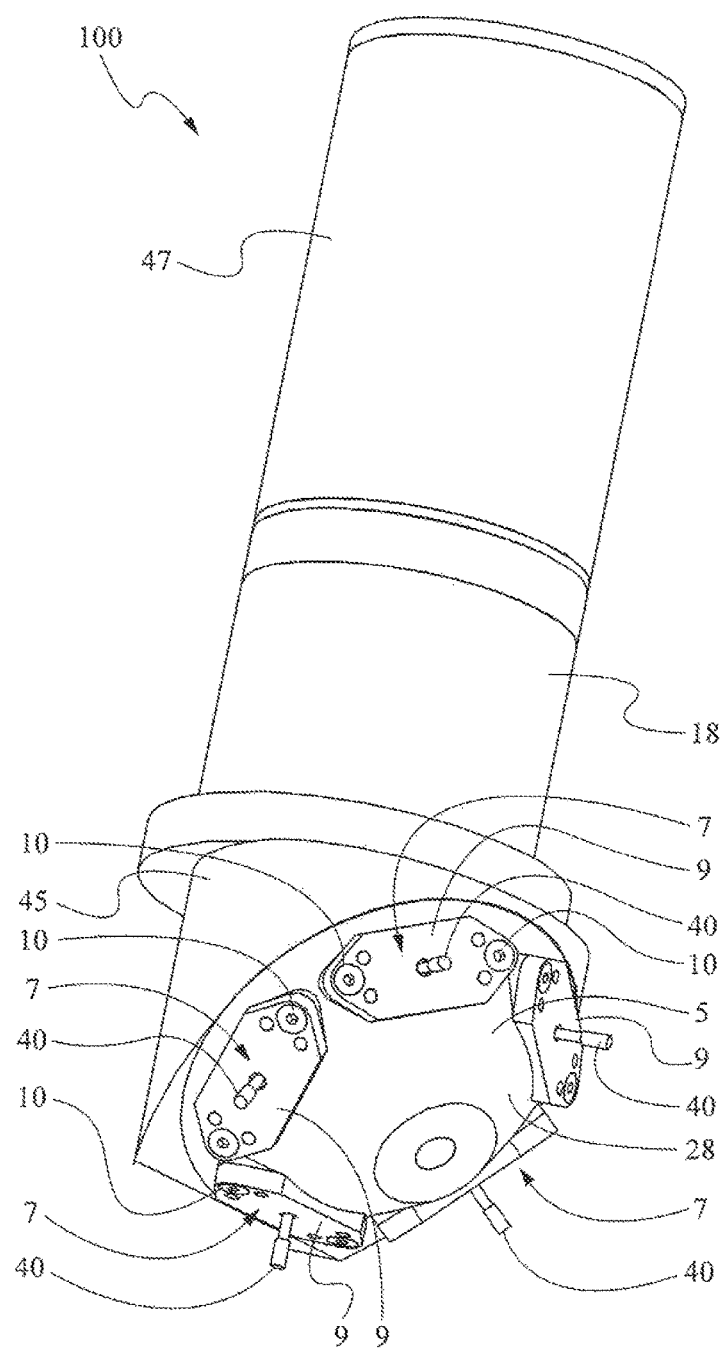
FIG. 8 is a schematic view of another embodiment of the electrospindle device according to the present invention, in an operating position.
Figure 9:
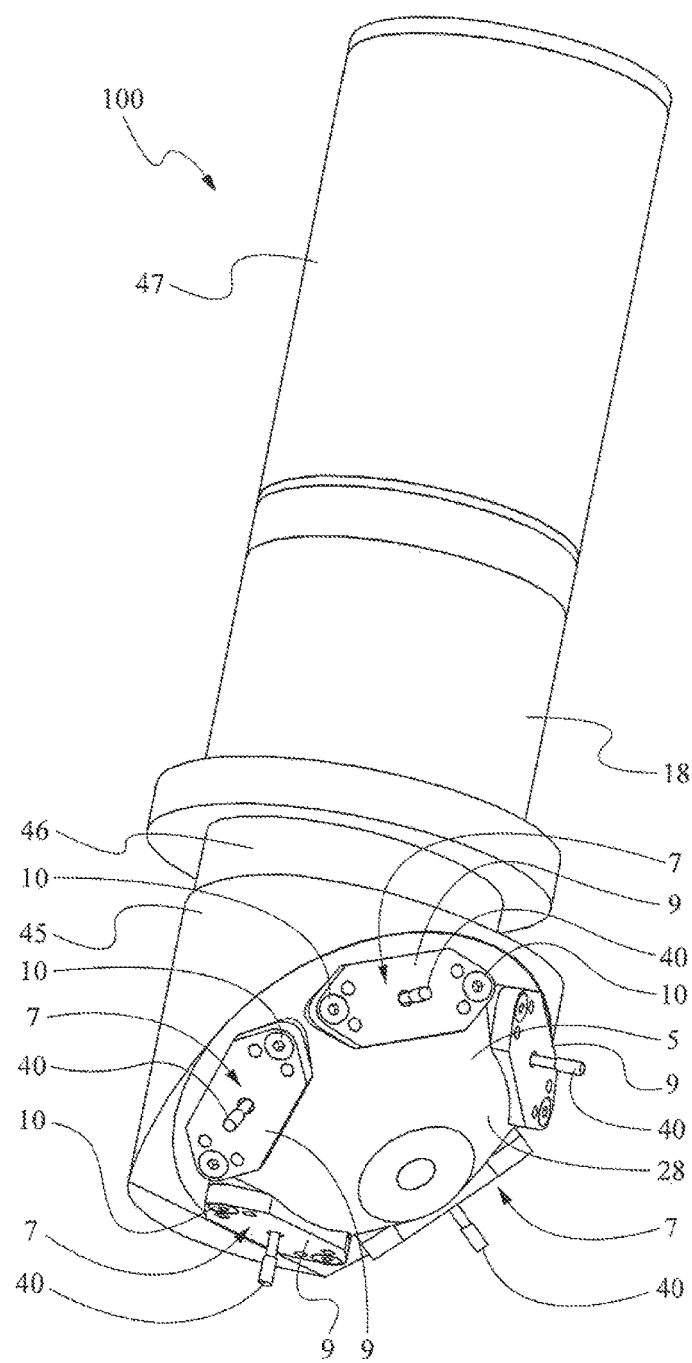
FIG. 9 is a schematic view of the embodiment of the electrospindle device of FIG. 8 in a rotated position for tool change.
Figure 10:
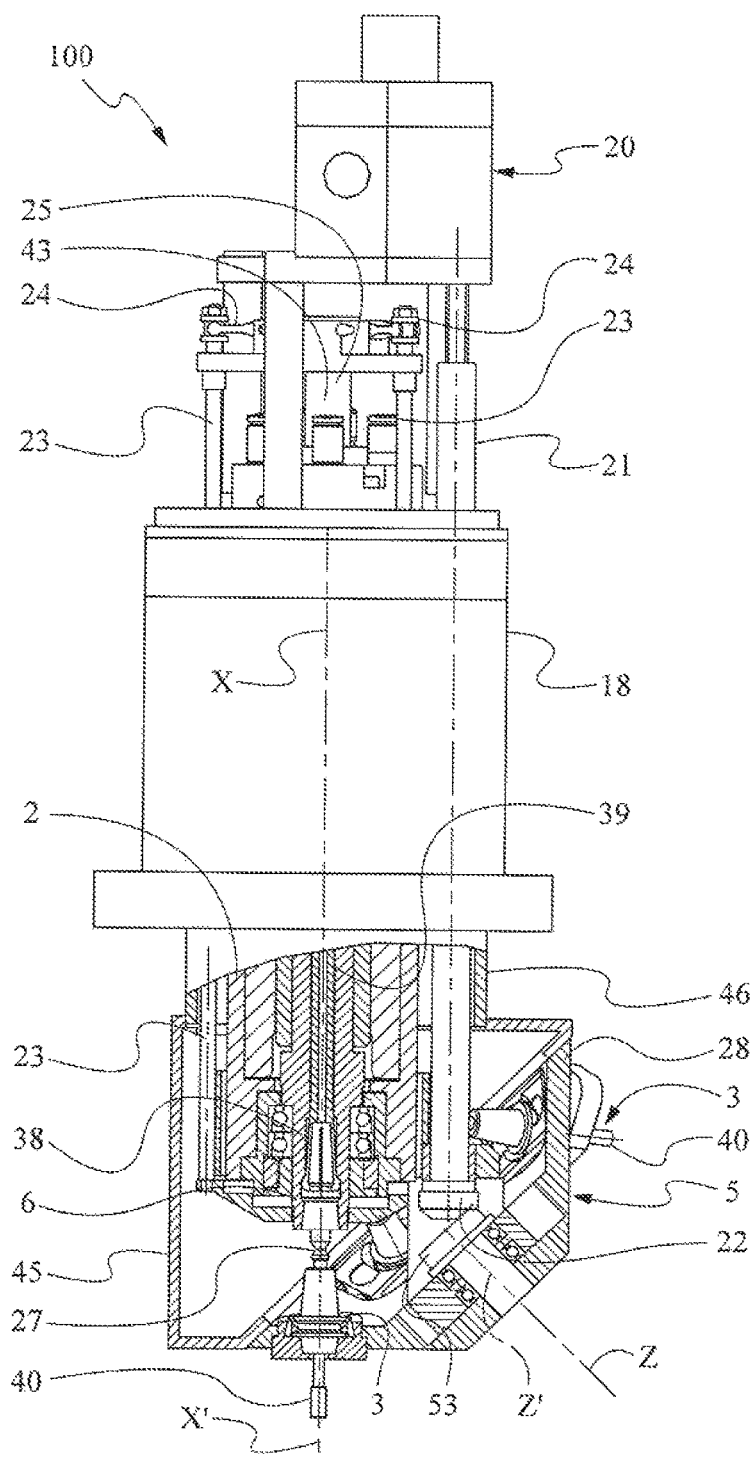
FIG. 10 is a schematic partially sectional view of the electrospindle device shown in FIG. 8.
Figure 11:
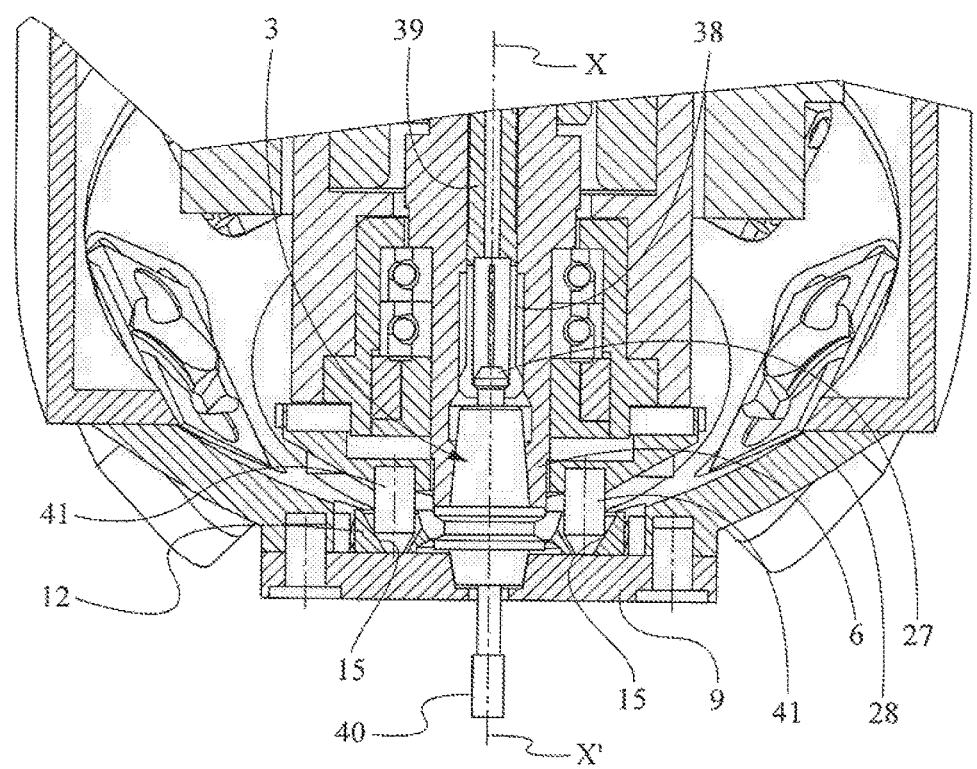
FIG. 11 is a schematic enlarged, partially sectional view of the lower end of the device according to the present invention, with a toolholder engaged in the self-centering device.
Figure 12:
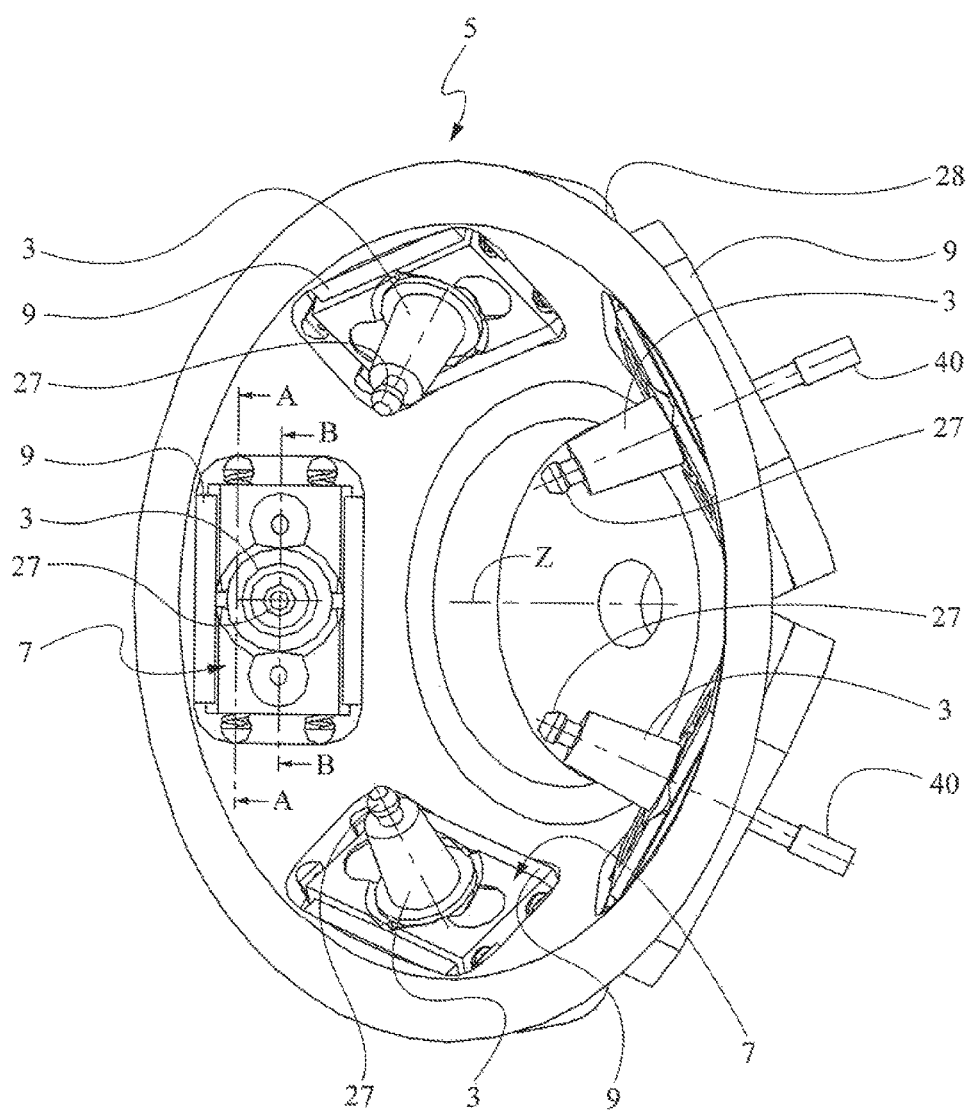
FIG. 12 is a view from inside of the toolholder support element according to the present invention.

The device 100 is in the operating position shown in FIG. 8 and the tool 40 can carry out the respective machining operation, at the end of which, should a further machining operation be required, the process described above will be repeated.

The present invention has been described with reference to some embodiments thereof. Many modifications can be introduced in the embodiments described in detail, still remaining within the scope of protection of the invention, defined by the appended claims.

The invention claimed is:
1. An electrospindle device (100) comprising:
a casing (45);
a toolholder support element (5) rotatably mounted to the casing (45), the toolholder support element (5) including plural toolholders (3), each of said toolholders (3) holding a respective machining tool (40), each of said toolholders (3) having a respective conical portion with a respective narrowed section (69), the toolholder support element (5) having a first end located adjacent an outer surface of the casing (45) and an opposite second end facing away from the casing, the toolholder support element (5) having an outer surface extending from the first end to the second end, the first end of the toolholder support element (5) having a width greater than a width of the second end, each of said toolholders (3) extending through the outer surface of the toolholder support element (5) in a region between the first end and the second end;
at least one electrospindle (2) extending about a vertical axis (X-X'), said at least one electrospindle (2) located at least partially within the casing (45), the at least one electrospindle (2) comprising
i) a rotating shaft (39) that rotates for transmitting motion, the rotating shaft (39) comprising an engagement portion (6) with a conical seat that receives the conical portion of a selected one of said toolholders (3);
(ii) a tie rod (99) that is provided within the rotating shaft (39), and that includes a head end having an engagement portion including a conical outer surface (51), and
(iii) a locking device comprising a cylindrical gripper (50) associated with the head end of the tie rod (99), the cylindrical gripper (50) having a conical inner surface corresponding to the conical outer surface (51) of the engagement portion of the tie rod (99), the cylindrical gripper having an outer surface (52) with an adjustable outer diameter,
wherein the head end of the tie rod (99) is slidable along the vertical axis (X-X') relative to the cylindrical gripper (50) so as to cause the outer diameter of the cylindrical gripper (50) to be increased or reduced, and
wherein the locking device is operable to selectively lock the selected one of the toolholders (3) to the rotating shaft (39) so that, when the selected one of the toolholders (3) is locked to the rotating shaft (39), the rotating shaft (39) directly rotates the selected one of the toolholders (3) and the corresponding held machining tool (40);
the electro spindle device (100) further comprising
a device for rotating the toolholder support element (5) such that an outer periphery of the first end of the toolholder support element (5) rotates, adjacent to and along an inner periphery of the casing (45) via a friction reducing element (73) connecting the outer periphery of the first end of the toolholder support element (5) to the inner periphery of the casing (45), wherein operation of the at least one device for rotating the toolholder support element (5) brings the selected one of said toolholders (3) into vertical alignment with the engagement portion (6) of the rotating shaft;
at least one translation unit for translating the toolholder support element (5) along the vertical axis (X-X') between
i) an operating position where at least a portion of the selected one of the toolholders (3) is engaged and locked, via the locking device (48), to said engagement portion (6) of the rotating shaft (39), and ii) a tool change position where the selected one of the toolholders (3) lies outside the engagement portion (6) of the rotating shaft (39), wherein operation of the device for rotating the toolholder support element (5) rotates the toolholder support element (5) to bring the selected one of said toolholders (3) into vertical alignment with the engagement portion (6) of the rotating shaft (39), wherein the at least one translation unit is operable to move the toolholder support element (5) from the tool change position to the operating position, and, while the toolholder support element (5) is at the operating position, the tie rod (99) is movable to an upper position so as to expand the outer surface (52) of the cylindrical gripper (50) to engage the outer surface (52) of the cylindrical gripper (50) with the narrowed section (69) of the selected one of the toolholders (3), thus locking the selected one of said toolholders (3) relative to the rotating shaft (39), thereby engaging the rotating shaft (39) with the selected one of said toolholders (3), making said selected one of said toolholders (3) and the corresponding held machining tool (40) directly rotatably actuated by said rotating shaft (39), and wherein the at least one translation unit is further operable to move the toolholder support element (5) from the operating position to the tool change position, and, while the toolholder support element (5) is at the tool change position, the tie rod (99) is movable from the upper position to a lower position where the outer surface (52) of the cylindrical gripper (50) does not engage the narrowed section (69) of the conical portion of the selected one of the toolholders (3), thereby disengaging the rotating shaft (39) from the selected one of the toolholders (3).

2. The electro spindle device (100) according to claim 1, further comprising a plurality of fastening elements (7) that fasten the toolholders (3) to the toolholder support element (5), and a plurality of locking elements (8) that lock the toolholders (3) to the toolholder support element (5).

3. The electrospindle device (100) according to claim 2, wherein,
said toolholder support element (5) further includes fastening seats (76) that accept at least a portion of the selected one of the toolholders (3) and keep the selected one of the toolholders (3) locked in position via the locking elements (8),
each of the locking elements (8) comprises at least one engagement element (12) for engaging the selected one of the toolholders, at least one elastic element (13) for pushing the at least one engagement element (12) into engagement with the selected one of the toolholders (3), and at least one counteracting element (14) for the at least one elastic element (13), and
the electrospindle device further comprising a release device for releasing the engagement of the at least one engagement element (12) with the selected one of the toolholders (3), the at least one elastic element (13) being a spring which pushes the at least one engagement element (12) against a recess (78) formed in an outer surface of the selected one of the toolholders (3).

4. The electrospindle device (100) according to claim 3, wherein said release device for releasing the engagement of the at least one engagement element (12) with the selected one of the toolholders (3) comprises:

a cylindrical bush (79) mounted so as to slide on the selected one of the toolholders along a direction parallel to the vertical axis (X-X') of the at least one electrospindle;
a flanged portion (91) associated with the at least one electrospindle (2), the flanged portion (91) being adapted to come into abutment against the bush (79) so as to cause the translation thereof in a direction parallel to the vertical axis (X-X') of the at least one electrospindle (2).

5. The electrospindle device (100) according to claim 3, wherein said toolholder support element (5) comprises a plurality of the toolholders (3) mounted along a circumference of the toolholder support element (5).

6. The electro spindle device (100) according to claim 2, wherein each of the locking elements (8) comprises at least one engagement element (12) for engaging the selected one of the toolholders, at least one elastic element (13) for pushing the at least one engagement element (12) into engagement with the selected one of the toolholders (3), and at least one counteracting element (14) for the at least one elastic element (13), and
the electrospindle device further comprising a release device for releasing the engagement of the at least one engagement element (12) with the selected one of the toolholders (3).

7. The electrospindle device (100) according to claim 2, wherein said toolholder support element (5) comprises a plurality of the toolholders (3) mounted along a circumference of the toolholder support element (5).

8. The electrospindle device (100) according to claim 1, wherein said plurality of toolholders (3) are mounted along a circumference of said toolholder support element (5).

9. The electrospindle device (100) according to claim 1, wherein said at least one translation unit comprises a pneumatic cylinder (18) adapted to translate the toolholder support element (5) along the vertical axis (X-X') of the at least one electrospindle (2).

10. The electrospindle device (100) according to claim 1, wherein said toolholders are arranged along a circumference of the toolholder support element, which circumference is slanted relative to the vertical axis (X-X') of the at least one electrospindle (2).

11. The electrospindle device (100) according to claim 1, further comprising:
a bearing (71);
a cage (72) comprising a plurality of balls, said cage (72) being interposed between said toolholder support element (5) and said at least one electrospindle (2).

12. The electrospindle device (100) according to claim 1, wherein each of the toolholders (3) comprises a respective seat adapted to receive the cylindrical gripper (50).

13. The electrospindle device (100) according to claim 1, wherein the device (20) for rotating the toolholder support element has a motor (80) incorporating an encoder, a first gear (81) integral with the rotating shaft (39) of the at least one electrospindle (2), at least one second gear (82) steadily associated with the toolholder support element (5), and at least one third gear (83) arranged between said at least one electrospindle (2) and said toolholder support element (5).

14. A process for changing a tool in the electrospindle device according to claim 1, comprising the steps of:
a) lifting the toolholder support element (5) so that a flanged portion (91) associated with the at least one electrospindle no longer contacts the selected one of the toolholders (3);

b) engaging engagement elements (12) with the selected one of the toolholders (3);

c) releasing the selected one of the toolholders (3) from the engagement portion (6) of the rotating shaft (39);

d) lowering the toolholder support element (5) until the selected one of the toolholders (3) is extracted from the engagement portion (6) of the rotating shaft (39);

e) rotating the toolholder support element (5) for to bring the engagement portion (6) of the rotating shaft into vertical alignment with a second one of the toolholders (3);

f) lifting the toolholder support element (5) until the second one of the toolholders (3) is at least partially inserted into the engagement portion (6) of the rotating shaft (39);

g) connecting the second one of the toolholders (3) to the engagement portion (6) of the rotating shaft (39);

h) disengaging the engagement elements (12) from the second one of the toolholders (3).

15. The electrospindle device (100) according to claim 1, wherein said toolholder support element (5) comprises a plurality of fastening elements (7) for fastening the toolholders (3) to the toolholder support element (5).

16. The electrospindle device (100) according to claim 1, wherein said toolholder support element (5) comprises a plurality of toolholders (3) mounted along a circumference of the toolholder support element.

17. An electrospindle device (100) comprising:
a casing (45);
a toolholder support element (5) rotatably mounted to the casing (45), the toolholder support element (5) including plural toolholders (3), each of said toolholders (3) holding a respective machining tool (40), each of said toolholders (3) having a respective conical portion with a respective narrowed section (69), the toolholder support element (5) having a first end located adjacent an outer surface of the casing (45) and an opposite second end facing away from the casing, the toolholder support element (5) having an outer surface extending from the first end, each of said toolholders (3) extending through the outer surface of the toolholder support element (5);
at least one electrospindle (2) extending about a vertical axis (X-X'), said at least one electrospindle (2) located at least partially within the casing (45), the at least one electrospindle (2) comprising
i) a rotating shaft (39) that rotates for transmitting motion, the rotating shaft (39) comprising an engagement portion (6) with a conical seat that receives the conical portion of a selected one of said toolholders (3);
(ii) a locking device (48) for releasably locking the selected one of the toolholders to said rotating shaft (39);

wherein the locking device is operable to selectively lock the selected one of the toolholders (3) to the rotating shaft (39) so that, when the selected one of the toolholders (3) is locked to the rotating shaft (39), the rotating shaft (39) directly rotates the selected one of the toolholders (3) and the corresponding held machining tool (40);

the electro spindle device (100) further comprising a device for rotating the toolholder support element (5) such that an outer periphery of the first end of the toolholder support element (5) rotates, adjacent to and along an inner periphery of the casing (45) via a friction reducing element (73) connecting the outer periphery of the first end of the toolholder support element (5) to the inner periphery of the casing (45), wherein operation of the at least one device for rotating the toolholder support element (5) brings the selected one of said toolholders (3) into vertical alignment with the engagement portion (6) of the rotating shaft;

at least one translation unit for translating the toolholder support element (5) along the vertical axis (X-X') between
  i) an operating position where at least a portion of the selected one of the toolholders (3) is engaged and locked, via the locking device (48), to said engagement portion (6) of the rotating shaft (39), and
  ii) a tool change position where the selected one of the toolholders (3) lies outside the engagement portion (6) of the rotating shaft (39), wherein operation of the device for rotating the toolholder support element (5) rotates the toolholder support element (5) to bring the selected one of said toolholders (3) into vertical alignment with the engagement portion (6) of the rotating shaft (39), wherein the at least one translation unit is operable to move the toolholder support element (5) from the tool change position to the operating position, and, while the toolholder support element (5) is at the operating position, the locking device (48) is operable to lock the selected one of said toolholders (3) relative to the rotating shaft (39), thereby engaging the rotating shaft (39) with the selected one of said toolholders (3), making said selected one of said toolholders (3) and the corresponding held machining tool (40) directly rotatably actuated by said rotating shaft (39), and wherein the at least one translation unit is further operable to move the toolholder support element (5) from the operating position to the tool change position, and, while the toolholder support element (5) is at the tool change position, the locking device is operable to unlock the selected one of the toolholders (3) from the rotating shaft (39), thereby disengaging the rotating shaft (39) from the selected one of the toolholders (3).

\* \* \* \* \*